United States Patent [19]

Edwards et al.

[11] 4,156,395
[45] May 29, 1979

[54] HIGH-SPEED PLANTING METHOD AND MACHINE

[75] Inventors: Bryant Edwards, Clarendon Hills; Stanley R. Krogman, Bartlett; Edward J. McArdle, Morton Grove, all of Ill.

[73] Assignee: Illinois Tool Works Inc., Chicago, Ill.

[21] Appl. No.: 864,976

[22] Filed: Dec. 27, 1977

[51] Int. Cl.² .................. A01C 11/02; A01G 23/04
[52] U.S. Cl. ................................. 111/3; 47/73; 47/86; 111/86; 414/413; 414/417
[58] Field of Search .............. 111/2, 3; 214/306, 310; 47/85–87, 77, 73, 74

[56] References Cited

U.S. PATENT DOCUMENTS

| | | | |
|---|---|---|---|
| 2,475,078 | 7/1949 | Cherry | 111/3 X |
| 2,514,522 | 7/1950 | Shelton | 111/3 |
| 2,719,498 | 10/1955 | Goolsby | 111/3 X |
| 3,062,395 | 11/1962 | Behling | 214/310 |
| 3,221,681 | 12/1965 | Snyder et al. | 111/3 |
| 3,446,164 | 5/1969 | Huang et al. | 111/3 |
| 3,524,419 | 8/1970 | Middleton | 111/2 |
| 3,712,252 | 1/1973 | Huang | 111/2 |
| 3,722,719 | 3/1973 | Frank | 214/310 |
| 3,757,468 | 9/1973 | Shirouzu | 111/3 X |
| 3,923,332 | 12/1975 | Shirouzu | 111/2 X |
| 4,112,857 | 9/1978 | Bradley | 111/3 |

FOREIGN PATENT DOCUMENTS

| | | | |
|---|---|---|---|
| 80062 | 4/1951 | Czechoslovakia | 111/2 |
| 45369 | 1/1931 | Denmark | 111/3 |
| 468367 | 11/1928 | Fed. Rep. of Germany | 111/3 |
| 654620 | 9/1937 | Fed. Rep. of Germany | 111/2 |
| 849197 | 7/1949 | Fed. Rep. of Germany | 111/3 |
| 928130 | 5/1955 | Fed. Rep. of Germany | 111/3 |
| 1141482 | 12/1962 | Fed. Rep. of Germany | 47/85 |
| 2013629 | 10/1971 | Fed. Rep. of Germany | 111/3 |
| 2330600 | 5/1974 | Fed. Rep. of Germany | 111/2 |
| 22915 | 3/1962 | German Democratic Rep. | 111/3 |
| 324865 | 2/1930 | United Kingdom | 111/3 |
| 337412 | 10/1930 | United Kingdom | 111/3 |
| 1179807 | 2/1970 | United Kingdom | 47/87 |
| 1219366 | 1/1971 | United Kingdom | 111/2 |
| 521861 | 7/1976 | U.S.S.R. | 111/2 |

*Primary Examiner*—Edgar S. Burr
*Assistant Examiner*—Steven A. Bratlie
*Attorney, Agent, or Firm*—Thomas W. Buckman; Robert W. Beart; Edward L. Benno

[57] ABSTRACT

A high-speed planting method and machine in which a plurality of plants are provided in a plurality of webs. The webs are flexible and each web carries a plurality of plants fixed in an array of a plurality of adjacent rows and substantially perpendicular ranks. In the method and machine, each web is bent in a curve about an axis parallel to the ranks of plants, and during the bending operation each leading rank of plants is ejected from the web as a group. Concurrently with that operation, each removed rank of plants is conveyed toward the ground, and each plant in each conveyed rank is successively set into the ground in spaced relation along a line.

12 Claims, 8 Drawing Figures

HIGH-SPEED PLANTING METHOD AND MACHINE

BACKGROUND OF THE INVENTION

In the prior art of planting methods and machines, various arrangements are known for successively setting plants in a spaced-apart relationship to each other in a row in the ground. Machines are also known that will successively set plants along the line of travel of the machine as it continuously moves over the ground. One commonly used arrangement involves a person seated on the machine who manually takes one plant at a time from a group of plants and deposits each plant in a plant conveying and setting mechanism as the machine moves slowly over the ground. The maximum speed of such machines is generally limited by the maximum rate at which a person can place plants in the plant conveying mechanism. Some machines, in an effort to increase the planting rate, provide two seats for two persons to sit side-by-side and alternately deposit plants in the same plant conveying mechanism. Such arrangements still require, as a practical matter, that the tractor which draws or carries the machine move at a relatively slow pace, such as one-half to one and one-half miles per hour. To achieve greater efficiencies with such machines, many farmers will mount two or four such machines on a common frame and thereby plant two or four rows at the same time.

A number of prior art patents which do not necessarily represent practical machines, do show attempts to substantially increase the speed at which plants are set into the ground by using tapes, belts or ribbons in which a plurality of plants are carried and thereby fed into a machine. Other prior art patents show the use of trays of plants and mechanisms which are said to be capable of removing the plants from the trays and of delivering them to some plant settng means as the machine moves forwardly over the ground. While many of the planting machines of prior art patents are purported to be capable of the high-speed setting of plants in the ground, their practical use for high-speed planting operations is questionable.

SUMMARY OF THE INVENTION

As opposed to known prior art planting machines, a reduction to practice of one embodiment of the subject invention has established that the invention does teach a practical high-speed method and machine for setting transplants in the ground. That result is accomplished through the use of a basic unit or module which comprises a flexible web in which a plurality of plants are positively held in an array of a plurality of adjacent rows and substantially perpendicular ranks. Because each of the plants is fixed in the flexible web, it is positively located relative to the web, and by appropriate indexing of the web in a machine, each plant is positively located relative to the operating elements of the machine. Further, because the web is flexible, it is easily bent in the method and the machine to fan the top growth of the plants to aid in preventing interference between the top growth of plants in adjacent ranks of plants. Additionally and importantly to the practice of the invention, because of the array arrangement in the web, an entire rank of plants can be removed as a group from the web and thereafter handled essentially as a group in the transmission of the plants to the means which sets individual plants in the ground.

The primary object of the invention is to provide a method and machine for the high-speed setting of plants into the ground in which the method contemplates the steps of, and the machine comprises means for, handling, conveying and otherwise directing or moving plants in groups sufficiently large enough to provide a method and machine inherently capable of high-speed planting.

Other objects and features of the invention will be apparent upon a perusal of the hereinafter following detailed description read in conjunction with the drawings.

BRIEF DESCRIPTION OF THE DRAWINGS

FIG. 8 is an enlarged cross-sectional view of the plant setting means and taken substantially along the line 8—8 of FIG. 5.

DETAILED DESCRIPTION OF THE PREFERRED EMBODIMENTS

Figure 5:
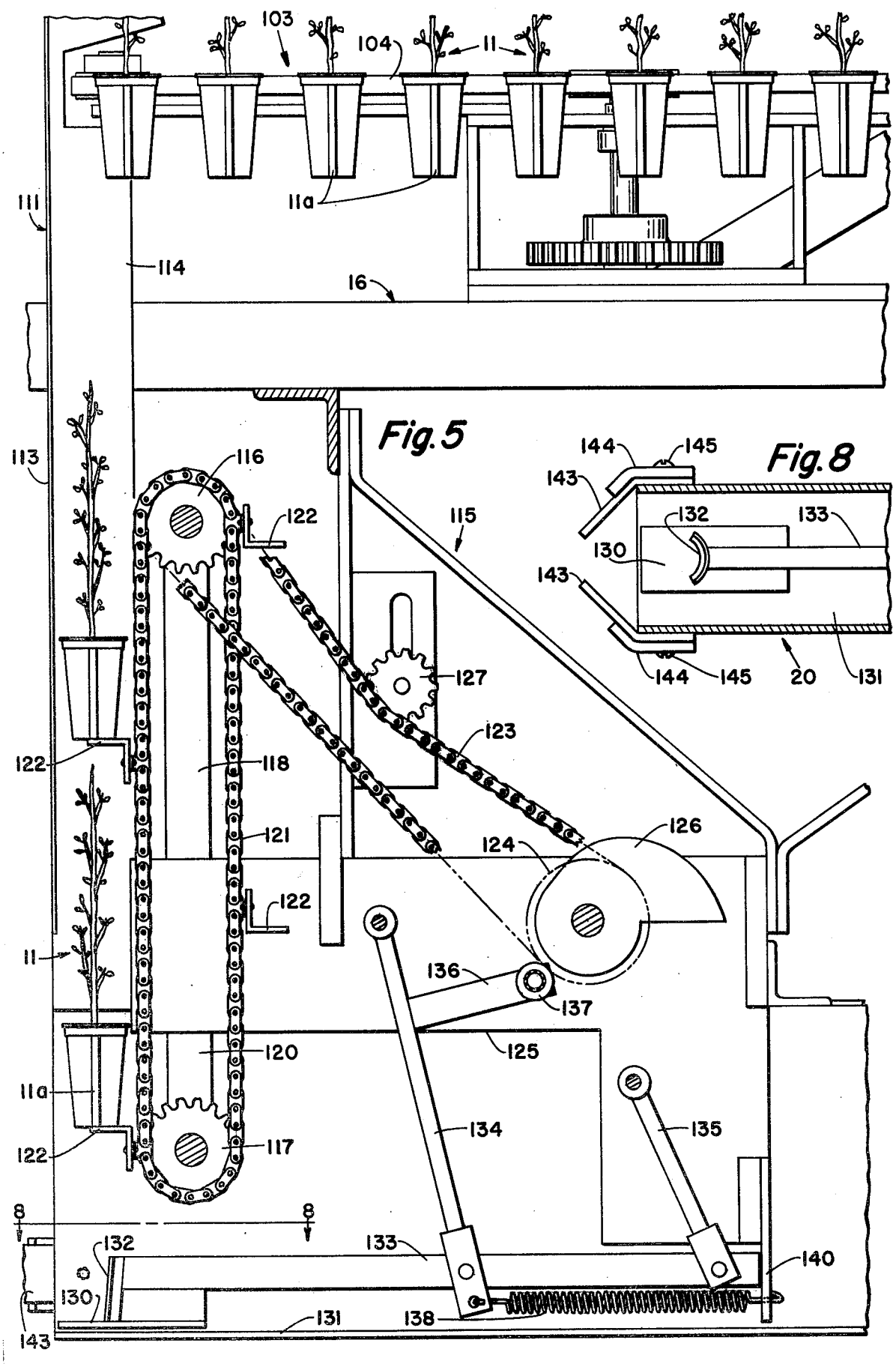
FIG. 5 is an enlarged cross-sectional view of a portion of the conveying and plant setting means of the machine of FIG. 1.
Figure 6:
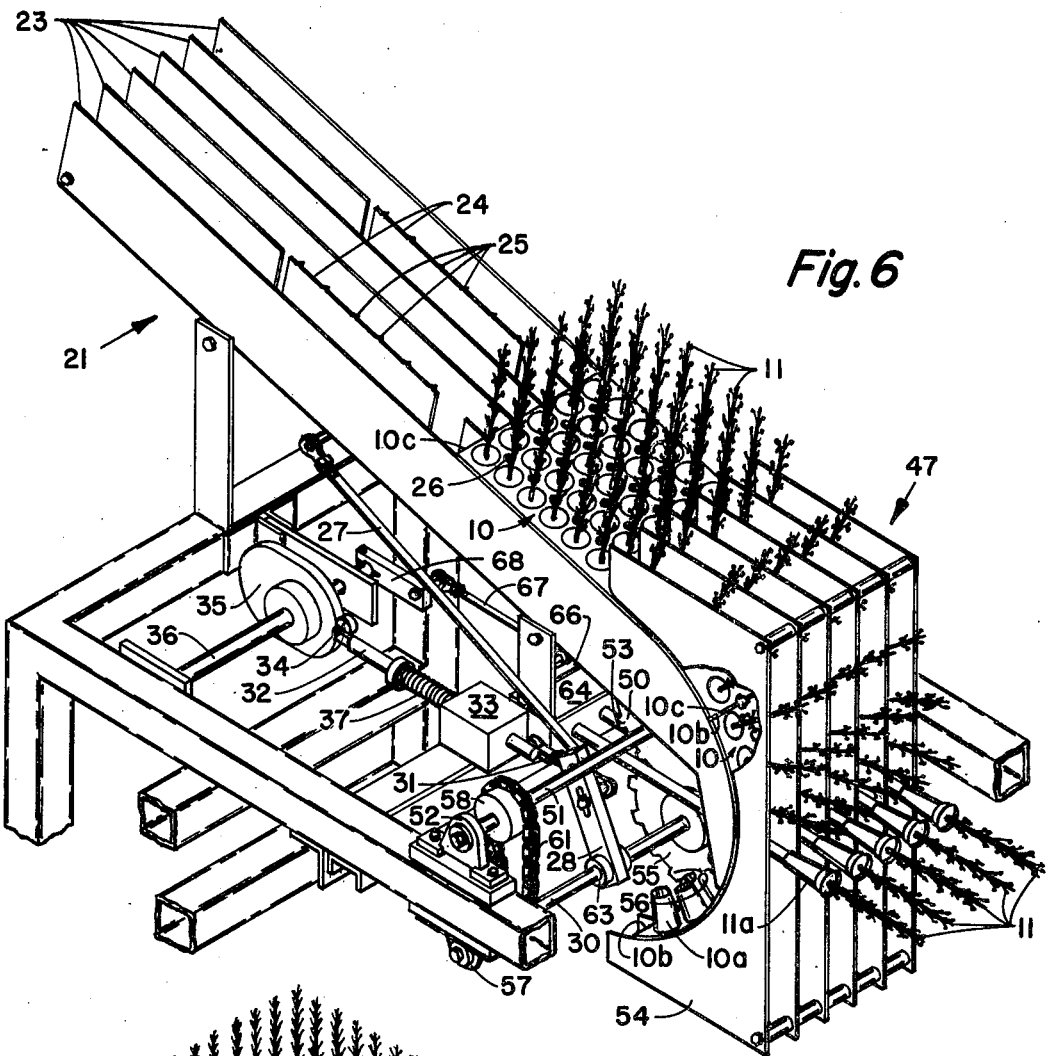
FIG. 6 is an isometric view of the web handling and plant ejector mechanisms of the machine of FIGS. 1 and 2.
Figure 7:
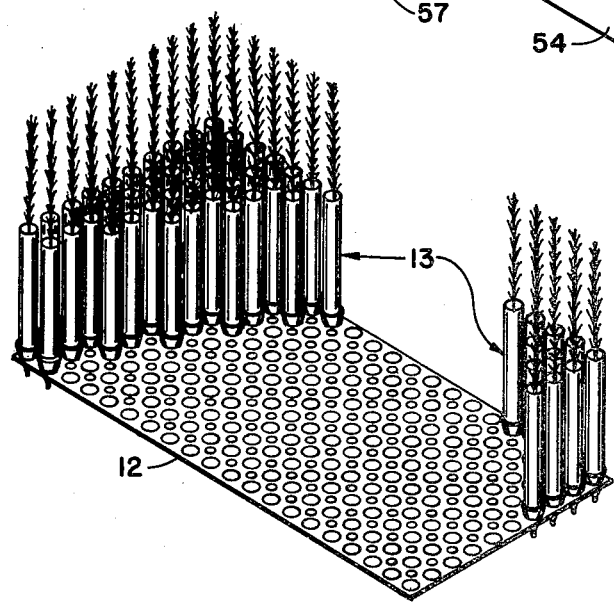
FIG. 7 is an isometric view of another web and plant arrangement which may be used in a modified form of the machine of FIGS. 1-6.

FIGS. 6 and 7 show two different forms of flexible webs carrying plants fixed in the webs in an array of a plurality of adjacent rows and substantially perpendicular ranks. The machine embodiment of FIGS. 1-6 is intended to use the web and plant arrangement shown in FIG. 6, and those skilled in this art will, upon a study of the hereinafter following description, understand that the machine of FIGS. 1-6 can be modified to handle the web and container arrangement of FIG. 7.

The web 10 of FIG. 6 preferably comprises a thin sheet of plastic material such as polystyrene that has been thermoformed to have a plurality of sleeves or pockets 10a depending from the upper surface thereof. A number of sleeves 10a are shown in the lower portion of FIG. 6 in an inverted position in which position the plants such as plants 11 have been removed from the web 10 and the web 10 is being moved out of the plant ejector area of the machine. The sleeves 10a are formed in the web 10 in an array of a plurality of adjacent rows and ranks which are substantially perpendicular to the rows. In the specific embodiment of the web 10 shown in FIG. 6 there are five rows of sleeves 10a with ten sleeves in each row. The leading edges of the webs 10 seen in FIG. 6 have been indicated at 10b with the trailing edges being indicated at 10c.

Preferably, in the thermoforming of the sleeves 10a, the plastic material is thinned to render the sleeves extremely flexible. The lower end of each sleeve 10a is open to cooperate with the base of each of the frames 11a of the plants 11 substantially as taught in U.S. Pat.

No. 4,031,832. The frames 11a are shown in greater detail in FIGS. 3-5, and briefly, comprise an imperforate base with a plurality of ribs upstanding from the periphery of the base with the upper ends of the ribs integrally connected to an upper ring element. In that arrangement, each frame 11a is positionable in one of the sleeves 10a to therewith define a complete plant container. The lower edge of each sleeve 10a cooperates with each base of a frame 11a to provide drainage openings therebetween during the growth of the plants in the defined containers. Each plant 11 further comprises a quantity of growing medium within a frame 11a with the roots of the plant extending throughout the growing medium and with top growth extending thereabove. The method and machine of the invention contemplates the use of a wide range of different types or species of plants such as, for example, conifers, tomatoes and pepper plants. Reference to the noted U.S. Pat. No. 4,031,832 will teach those skilled in this art that the frame 11a of the plants 11 will not interfere with the healthy growth of the plant after it has been set into the ground for further growth therein.

The web 12 of FIG. 7 preferably comprises a thin sheet of an elastic plastic material such as polyethylene that has been punched to provide a plurality of holes therein arranged in an array of a plurality of adjacent rows and ranks which are substantially perpendicular to the rows. The plants 13 are also taught in U.S. Pat. No. 4,031,832. As opposed to the web 10 and plant 11 arrangement above described, the web 12 and plant 13 arrangement of FIG. 7 essentially differs in that the sleeves of the plants 13 are not integrally formed with the web 12, but are separately formed and supported on the frame of the plants 13. Those skilled in this art will understand that if the sleeves of the plants 13 are formed of a material that will interfere with the healthy growth of the plants when they have been set into the ground, a practice of the method and machine of the invention should include a removal of the sleeves prior to setting of each plant 13 into the ground. In the embodiment of FIG. 7, the somewhat bullet shaped base of the frames of the plants 13 are securely releasably held in the web 12 to fix the plants 13 in an array of a plurality of adjacent rows and substantially perpendicular ranks. In the practice of the subject invention with the web 12 and plant 13 arrangement of FIG. 7, the machine of FIGS. 1-6 may be modified to omit the plow and to provide a positive plant injection mechanism to injection plant each of the plants 13 in the plant setting operation.

Figure 1:
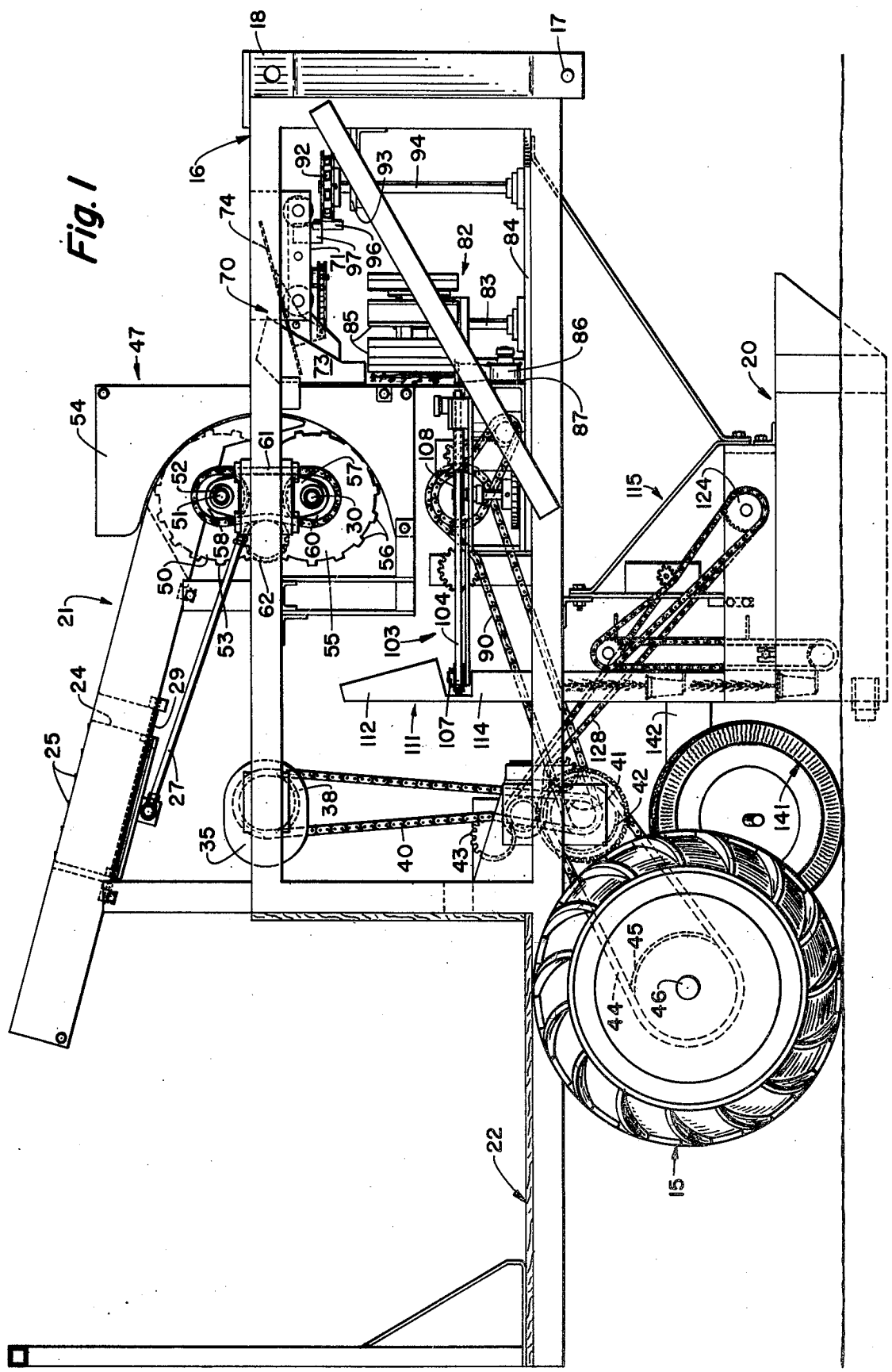
FIG. 1 is a side elevational view of a planting machine according to one embodiment of the invention.
Figure 2:
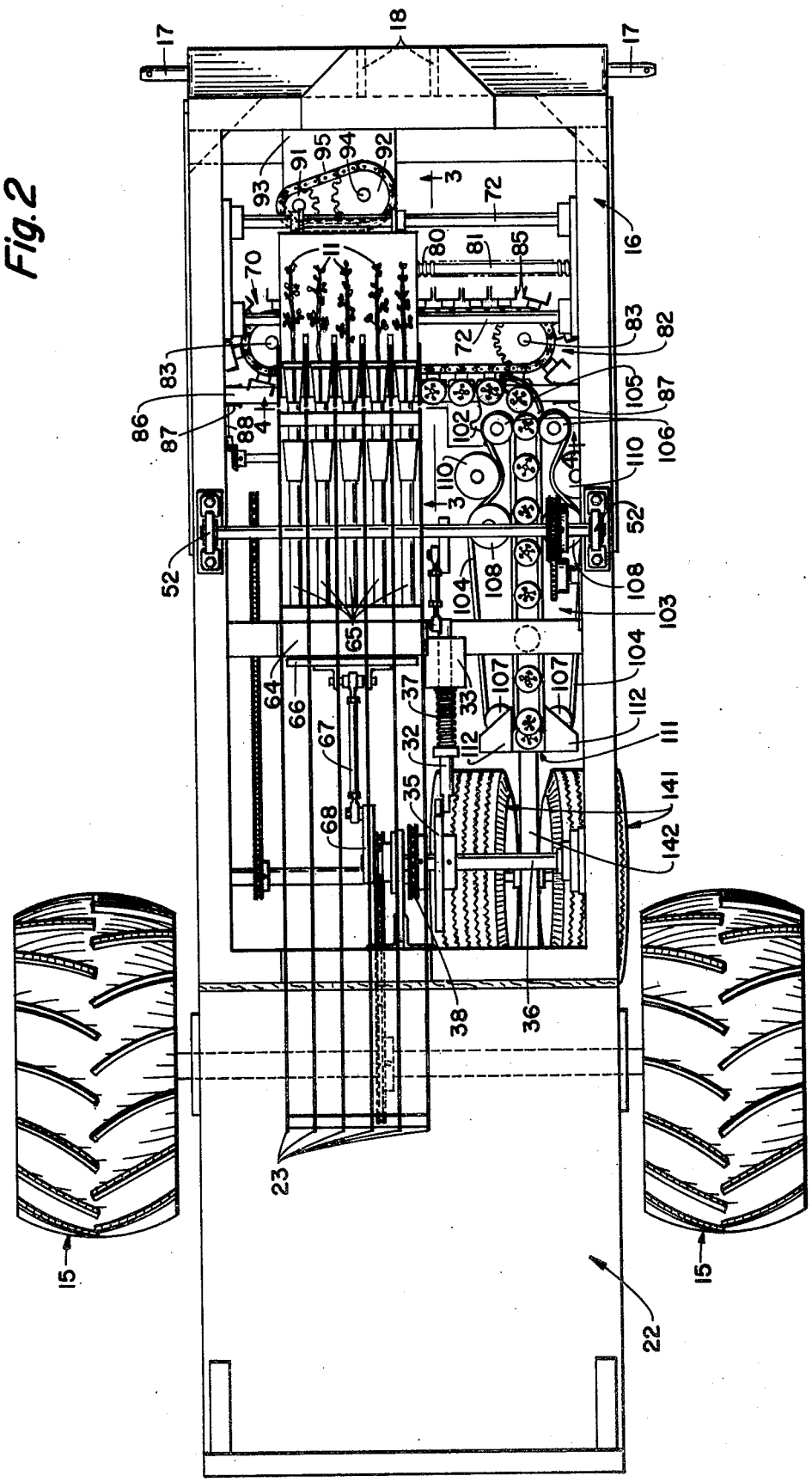
FIG. 2 is a top plan view of the machine of FIG. 1.

The machines of FIGS. 1 and 2 is shown in a form for mounting of the machine on a standard three point hitch on the rearward end of a farm tractor to enable a machine to be pulled over the surface of the ground when the ground drive wheels 15 are on the ground, and to enable the machine to be raised above the ground upon turning of the tractor at each end of a row. The machine is also shown as a one row planting machine. It should be understood that the invention can be also practiced by mounting a plurality of units upon a common tool bar carried by a tractor for planting more than one row in a field as the tractor proceeds over the field.

The various parts of the machine are mounted on a generally rectangular frame 16. To carry the frame 16 on the three point hitch assembly of a farm tractor, a pair of spaced-apart pins 17 are provided at the lower forward end of the frame 16, and a pair of pin receiving plates 18 are mounted in a spaced-apart relationship to each other at the center upper forward end of the frame 16.

When the frame 16 is supported from a tractor in the substantially horizontal position shown in FIG. 1 with the ground drive wheels 15 upon the ground and with the plow assembly 20 substantially in the ground, the machine is in its normal operating position for planting.

The input conveyor mechanism of the machine is generally shown at 21 and that input conveyor mechanism is shown in substantial detail in the isometric view of FIG. 6. The rearward end of the conveyor mechanism 21 is accessible to a person positioned on the platform 22 at the rearward end of the frame 16 as may be seen in FIGS. 1 and 2. The conveyor mechanism 21 comprises a plurality of vertically positioned spaced-apart plates 23 supported on the frame 16. The spacing between the plates 23, which are six in number in the embodiment shown, is substantially equal to the center-to-center distance between plants 11 of adjacent rows in the web 10. Thus, it may be seen that a person on the platform 22 may take a web 10 and plant 11 assembly from a suitable rack or storage area (not shown) accessible to the platform 22 and place the web 10 on the upper edges of the plates 23 with the sleeves 10a depending between the plates 23. To move a web 10 on the conveyor mechanism 21, a pair of plates 24 are provided between a discontinuous portion of two of the plates 23, the second and fifth plates 23 in the embodiment shown. The upper edge of each plate 24 is provided with teeth 25 which are spaced apart along each plate 24 to engage holes such as holes 26 in the web 10 shown in FIG. 6. Each of the teeth 25 is formed to have a vertical edge on the leading side thereof in the direction of feed into the machine and an inclined edge on the trailing side thereof. The lower edges of the plates 24 are rigidly secured to a frame that is journaled on a pair of rods 29 that in turn are secured to the underside of the plates 23 to extend longitudinally of the plates 23. A crank and lever mechanism is provided for moving the plates 24. That mechanism causes the plates 24 to linearly reciprocate on the rods 29 a distance in each direction substantially equal to the distance between centers of the plants 11 within each row. That movement of the plates 24 in the feed-in direction causes the teeth 25 to engage the holes 26 in a web 10 and move or feed it one increment of spacing between plants 11 in the rows, and in the opposite direction of movement of the plates 24 the teeth 25 slide rearwardly on the underside of the web 10 to engage another set of holes 26. The crank and lever mechanism that cause the plates 24 to linearly reciprocate along their longitudinal axes comprises a link 27 pivotally secured at one end to the frame on the underside of the plates 24, and pivotally secured at its other or forward end to a rocker arm 28 which may be seen in FIG. 6. The lower end of the rocker arm 28 is carried on a shaft 30. Between the ends of the rocker arm 28, one end of a link 31 is pivotally connected thereto and the other end of the link 31 pivotally connected to the forward end of a rod 32. The rod 32 is journaled through a block 33 secured to the frame 16 of the machine. The rearward end of the rod 32 carries a cam roller 34 which engages the edge of a cam 35. The cam 35 is keyed on a shaft 36 and the shaft 36 is carried by suitable brackets from the frame 16 for rotation about its longitudinal axis. The rod 32 is spring biased by a coiled spring 37 to urge the cam roller 34 against the cam 35. The shaft 36 is rotated by a sprocket wheel 38 keyed to the shaft 36 as may be seen in FIGS. 1 and 2. The sprocket wheel 38 is driven by a roller chain 40 and a sprocket wheel 41. The sprocket wheel 41 is keyed on a common shaft with another sprocket wheel 42, and that common shaft is journaled in bearings secured to the frame 16. An idler sprocket wheel 43 supported on the frame 16 is used to tighten the roller chain 40 about the sprocket wheels 38 and 41. To rotate the sprocket wheel 42 to in turn drive the sprocket wheel 41, a roller chain 44 is provided. The roller chain 44 is further mounted on a sprocket wheel 45 and the sprocket wheel 45 is keyed on the shaft 46. The shaft 46 is journaled in suitable bearings secured to the underside of the frame 16, and the ground drive wheels 15 are keyed on each end of the shaft 46. Thus it may be seen that as the machine is pulled forwardly over the ground, the ground drive wheels 15 will be rotated to rotate the sprocket wheel 45, to in turn rotate the sprocket wheel 42, to in turn rotate the sprocket wheel 41, to in turn rotate the sprocket wheel 38, to in turn rotate the shaft 36 and the cam 35 keyed thereon. As the cam 35 rotates it will, through the cam roller 34, cause the rod 32 to linearly reciprocate to the extent determined by the profile of the cam 35. As the rod 32 reciprocates it will, through the link 31, rock the lever 28 about the axis of the shaft 30. As the lever 28 is rocked it will, through its connection with the rod 27, causes the plates 24 to linearly reciprocate to incrementally feed each rank of plants 11 in a web 10 along the plates 23 as described above and into the plant ejector mechanism, indicated generally at 47.

The plates 23 may further be described as extending into and forming part of the plant ejector mechanism 47. As part of the plant ejector mechanism 47, the plates 23 are curved downwardly and forwardly as shown in FIGS. 1 and 6. The second and fifth plates 23 are discontinuous in the plant ejector mechanism 47 to receive the upper portions of two cog wheels 50 within the planes of those plates. The cog wheels 50 are keyed on a shaft 51 and the shaft 51 is journaled in a pair of bearings 52 secured to the frame 16. The cog wheels 50 are provided with teeth 53, and the cog wheels 50 are so positioned in the plant ejector mechanism 47 that the teeth 53 will enter the holes 26 in a web 10 and, as the cog wheels 50 are rotated, in a clockwise direction as viewed in FIG. 1, a web 10 and plants 11 will be drawn into the plant ejector mechanism 47. It may be seen that the spacing between the plates 24 and the cog wheels 50 should be such that the teeth 53 on the cog wheels 50 pick up a web 10 before it completely leaves the teeth 25 of the plates 24.

The plant ejector mechanism 47 further comprises six plates 54 which have one edge shaped generally as a semicircle, and each of the six plates 54 is secured to the frame 16 and substantially in the vertical plane of one of the plates 23 with the semicircle portion adjacent the plates 23. Each of the plates 54 is spaced from the forward end of each of the plates 23 a distance sufficiently greater than the thickness of the planar surface of the web 10 so that the webs 10 will be easily drawn through and bent in a curve as shown in FIG. 6 as the webs 10 are drawn through the ejector mechanism 47. FIG. 6 shows how the top growth in adjacent ranks of plants 11 is fanned as the webs 10 are bent or curved in passing through the ejector mechanism 47.

In addition to the cog wheels 50, the ejector mechanism 47 comprises a second pair of cog wheels 55 having teeth 56. The cog wheels 55 are keyed on the shaft 30 and are axially positioned between the cog wheels 50 with each of the cog wheels 55 being substantially in the vertical plane of one of the third and fourth plates 23. The shaft 30 is journaled in a pair of bearings secured to the frame 16 such as bearing 57. The bearings 57 are so positioned that the teeth 56 of the cog wheels 55 will enter the holes 26 on each side of the center row of the sleeves 10a of a web 10, and upon rotation of the cog wheels 55 in timed relation to the cog wheels 50, a web 10 will be drawn completely through the ejector mechanism 47 and discarded from the ejector mechanism 47 at the lower rearward end of the plates 54. While not shown, it is contemplated that the machine would include a web disposal box or other arrangement for receiving the discarded webs 10 from the ejector mechanism 47.

The shaft 51 is provided with a sprocket wheel 58, and the shaft 30 is provided with a sprocket wheel 60 which may be seen in FIG. 1. The sprocket wheels 58 and 60 are disposed in the same vertical plane and a roller chain 61 is mounted thereabout. An idler sprocket wheel 62 is rotatively carried on the frame 16 and engages the roller chain 61 to tighten the roller chain 61 about the sprocket wheels 58 and 60. The shaft 30 is rotated by the lever 28. The lever 28 has been described above as carried on the shaft 30 and as being rocked about the axis of the shaft 30 as the ground wheels 15 are rotated to operate the input conveyor mechanism 21. The means for carrying the lever 28 on the shaft 30 is a one-way clutch 63 and that clutch is arranged so that as the lever 28 is rocked or pivoted in a clockwise direction, as viewed in FIG. 6, the lever 28 will also rotate the shaft 30, and as the lever 28 is pivoted in a counterclockwise direction, the shaft 30 will remain stationary. Thus it may be seen that the cog wheels 55 will be intermittently rotated in a clockwise direction in timed relation to the operation of the input conveyor mechanism 21. As is obvious, the cog wheels 50 will be correspondingly rotated by the roller chain 61. If necessary, a known detent or ratchet assembly can be provided on shafts 30 or 51 to prevent over travel of the cog wheels 50 and 55.

The ejector mechanism 47 further comprises a block 64 secured to the frame 16 and positioned transversely of the machine and at a vertical position substantially horizontally intersected by a horizontal plane vertically midway between the axes of the shafts 51 and 30. The block 64 is provided with five holes therethrough for slideably holding five ejector rods 65 in a parallel horizontally spaced-apart relationship and for permitted sliding movement in directions forwardly and rearwardly relative to the machine. The spacing between the rods 65 is substantially equal to the spacing between plants 11 in each rank of plants in the web 10. The rearward ends of the rods 65 are secured to a plate 66 as may be seen in FIG. 2. A link 67 is pivotally connected at one end thereof to the plate 66 and at the other end thereof to one end of a lever 68. The other end of the lever 68 is keyed to the shaft 36. As has been described above, the shaft 36 is caused to rotate as the ground wheels 15 are rotated as the machine is pulled along the ground. Thus it can be seen that as the shaft 36 is rotated, the lever 68 is rotated to move the link 67 to longitudinally reciprocate the rods 65 in the block 64. The reciprocation of the rods 65 is in a timed relationship to the operation of the input conveyor 21 and the rotation of the cog wheels 50 and 55 so that each successive rank of plants 11 in a web 10 is moved into and held in the horizontal plane through the rods 65 while the rods 65 are moved forwardly to their forwardmost position and rearwardly to their completely retracted position. Each of the rods has a length and a forward stroke or movement sufficient to project the forward end of each of the rods 65 against the base of one of the plants 11 and to eject or push each plant 11 forwardly substantially out of the sleeves 10a. That forward plant ejection position is shown in FIGS. 2 and 6.

Figure 3:
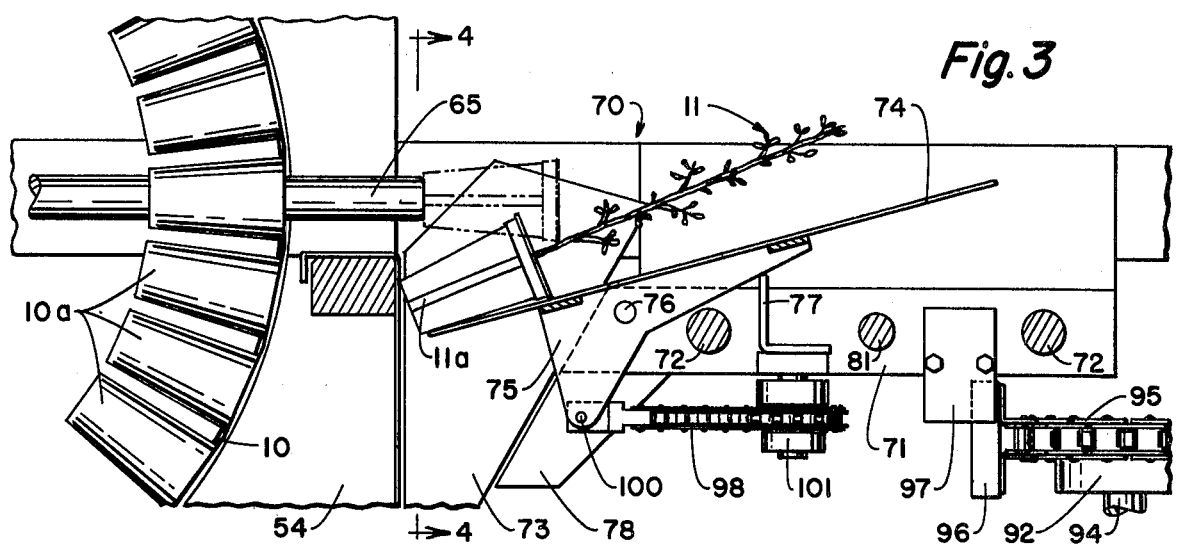
FIG. 3 is an enlarged side elevational view of a portion of the machine shown in FIG. 1 and taken generally along the line 3—3 of FIG. 2.
Figure 4:
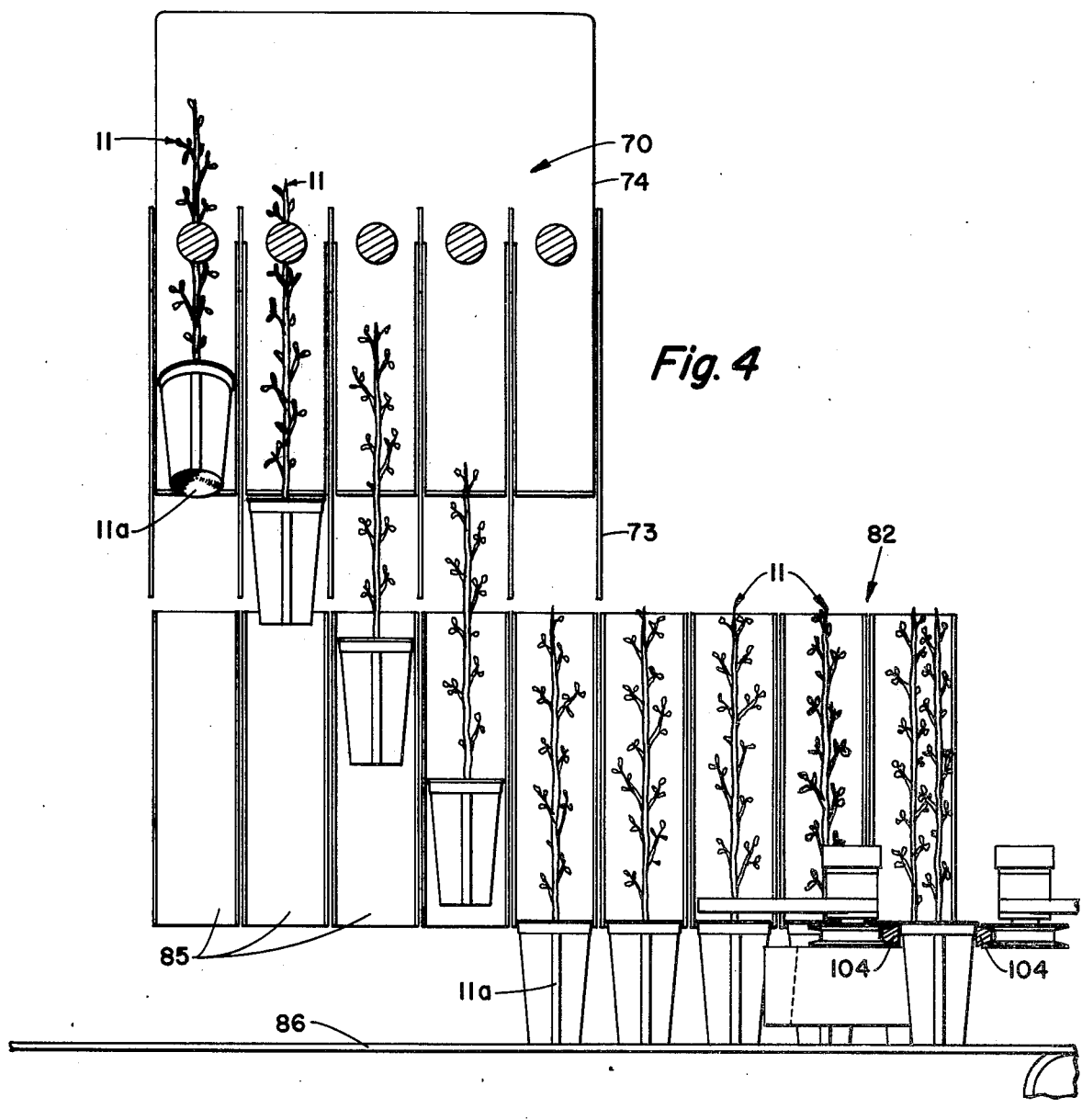
FIG. 4 is an enlarged cross-sectional view of the machine shown in FIGS. 1 and 2 and taken generally along the line 4—4 of FIG. 2.

As each rank of plants 11 as a group is ejected from the web 10, they drop onto a pivoting plate assembly 70 which may be seen in FIGS. 1, 2, 3 and 4. The assembly 70 comprises a frame 71 that is journaled on two rods 72 secured to the frame 16 as may be seen in FIG. 2. The frame 71 carries a chute element 73 and a plate 74. The chute element 73 comprises six vertically disposed horizontally spaced-apart plates with the spacing between the plates substantially equal to the spacing between rows of the plants 11 in the web 10. The plate 74 is carried on a subframe 75 that is pivotally mounted at 76 on the frame 71. The plate 74 is provided with four slots that permit the plate to pivot between the vertical plates of the chute element 73. The maximum clockwise position of the plate 74 is determined by a stop 77 which may be seen in FIG. 3. The stop 77 is also carried on the frame 71. The maximum counterclockwise position, as viewed in FIG. 3, of the plate 74 is a position just short of vertical and is determined by the stop 78 which may be seen in FIG. 3. The stop 78 is also carried on the frame 71. The plate 74 has sufficient weight cantilevered over the stop 77 to insure a gravity return of the plate 74 to the maximum clockwise position shown in FIG. 3. Further, the weight of five plants 11 resting on the plate 74, as shown in FIGS. 2 and 3, is not sufficient to tip the plate 74 toward the vertical. The frame 71 and the described parts carried thereon are maintained in the plant receiving position shown in FIGS. 2 and 3 by a compressed coiled spring 80 mounted on a rod 81. One end of the rod 81 is secured to the frame 16 and the other end thereof is journaled through a hole in the frame 71. The compressed coiled spring 80 reacts between the frame 71 and the frame 16 to urge the frame 71 against a stop (not shown) on one of the rods 72 to the plant receiving position shown in FIGS. 2 and 3. From the foregoing, it can be seen that as a group of plants 11 are ejected from the ejector mechanism 47, they fall onto the plate 74 between the vertical plates of the chute element 73. FIG. 4 shows various stages in the drop of a plant 11, and obviously, in the dropping of the plants the entire group falls together.

Beneath the pivoting plate assembly 70, the machine is provided with a cross conveyor assembly 82 which may be seen in FIGS. 1, 2 and 4. The cross conveyor assembly 82 comprises two vertical shafts 83 journaled in bearings secured to a plate 84 which is secured to the frame 16. Sprocket wheels (not shown) are keyed to the lower ends of the shafts 83 beneath the plate 84. The upper portions of each of the shafts 83 each carry a pair of vertically spaced-apart sprocket wheels and a pair of roller chains are mounted about the sprocket wheels of both shafts 83. "U" shaped plant guides 85 are secured to the roller chains on the sprocket wheels carried by the shafts 83 in vertically disposed side-by-side position substantially shown in FIG. 4. The cross conveyor 82 further comprises a belt conveyor 86. The belt conveyor 86 comprises a thin flexible fabric-reinforced belt carried about a pair of pulleys 87 which may be seen in FIG. 2. The pulleys 87 are supported on the plate 84, and the pulley 87 on the left side of the machine is driven by a shaft 88 as may be seen in FIG. 2. The shaft 88 is driven from a gear reducer assembly on the left side of the machine and substantially obscured in FIGS. 1 and 2. The gear reducer, through a pair of bevel gears, drives the shaft 88 to drive the belt conveyor 86. The belt conveyor 86 is further positioned in the machine substantially beneath the rearward flight of the "U" shaped plant guides 85 as may be seen in FIGS. 2 and 4. The gear reducer assembly is driven by a roller chain 90 which may be seen in FIG. 1. The roller chain 90 is driven from a further sprocket wheel on the shaft carrying the sprocket wheels 41 and 42, which sprocket wheels have been described above as being driven from the ground drive wheels 15. An output shaft (not shown) of the gear reducer assembly extends beneath the plate 84 and is there provided with a sprocket wheel. Even though that sprocket wheel and the drive extended therefrom are not shown, those skilled in this art will understand how the drive may be extended by roller chains to the various other sprocket wheels beneath the plate 84, such as the noted sprocket wheels on the lower ends of the shafts 83. Thus it should be understood that the cross conveyor 82, including the "U" shaped plant guides 85 and the belt conveyor 86, are continuously driven as the machine is pulled along the ground and in timed relationship to the other operating elements of the machine as described.

With the cross conveyor 82 continuously operating as the machine is pulled along the ground, the pivoting plate assembly 70 must, in transferring a group of plants 11 therefrom to the cross conveyor 82, follow the movement of the cross conveyor 82. To accomplish that coincident travel between the pivoting plate assembly 70 and the cross conveyor 82, a pair of sprocket wheels 91 and 92, which may be seen in FIG. 2 at the forward end of the frame 16, are provided. The sprockets 91 and 92 are rotatively supported on a bracket 93 secured to the frame 16. Sprocket wheel 92 is keyed to a shaft 94 that extends downwardly through the plate 84, and at the lower end of the shaft 94 a further sprocket wheel is provided and connected to the driving chains beneath the plate 84 previously noted to rotate the sprocket wheel 92 in timed relation to the other operating parts of the machine. A roller chain 95 is mounted about the sprocket wheels 91 and 92. The roller chain 95 is provided with an outwardly extending bracket 96 which may been seen in FIGS. 1 and 3. A fixed bracket 97 is secured to the frame 71 of the pivoting plate assembly 70 at a position to be engaged by the bracket 96 as the roller chain 95 carries the bracket 96 transversely of the machine from the left to the right side thereof. Thus, the bracket 96 will, in engaging the bracket 97, move the pivoting plate assembly 70 from its plant receiving position, shown in FIG. 2, toward the right side of the machine at the same speed as the cross conveyor 82 is moving.

As the pivoting plate assembly 70 is moving toward the right side of the machine, it is pivoted toward a vertical position to drop the group of plants 11 onto the belt conveyor 86 and between the "U" shaped plant guides 85. The means that causes the upward pivoting of the plate 74 to drop the plants 11 is a roller chain 98 which may be seen in FIG. 3. One end of the roller chain is connected at 100 to the bracket 75 that supports the plate 74. The roller chain 98 then proceeds about a sprocket wheel 101 which is rotatively carried on the frame 71 as may be seen in FIG. 3. The course of the other end of the roller chain 98 is not shown but its arrangement can be easily described. The other end of the chain 98 proceeds to an anchored position on the frame 16 on the left side of the machine so that as the frame 71 slides on the shafts 72 toward the right side of the machine, a pull is exerted on the roller chain 98 about the sprocket wheel 101 to the bracket 75 to cause the plate 74 to pivot about shaft 76 toward the vertical drop position for the plants 11. Preferably, the anchored connection of the chain 98 to the frame 16 is a spring biased connection to produce a more positive pivoting action to the plate 74. Once the bracket 98 carries the pivoting plate assembly 70 through the described plant dropping procedure, the bracket 96 passes around the sprocket wheel 92 and leaves the bracket 97. The coiled spring 80 then returns the pivoting plate assembly 70 to its plant receiving position. The chain 98 restores to allow the plate 74 to drop back against the stop 77. Those skilled in this art will understand that variations can be made in the described elements to transfer a group of plants 11 to the cross conveyor 82 as the machine is drawn along the ground.

From the cross conveyor 82, the plants are transferred by a starwheel 102 to the longitudinal conveyor assembly 103 shown in FIGS. 1 and 2. The starwheel 102 is carried on a vertical shaft journaled through the plate 84 and driven beneath the plate 84 by the driving chains beneath the plate 84 previously noted. Each pocket in the starwheel 102 will engage a frame 11a of a plant 11 adjacent the right side of the machine and will carry the plant 11 out of a "U" shaped plant guide 85 and between a pair of belts 104. A curved plate 105 positioned radially outwardly of the starwheel 102 aids in directing each plant 11 between the belts 104. Each of the belts 104 is a continuous belt directed about pulleys 106, 107 and 108. A belt tensioning pulley 110 is also provided for each of the belts 104 and is positioned against the outer side surface of a belt 104 as shown in FIG. 2. Each of the pulleys 106, 107, 108 and 110 is mounted on a vertical shaft supported on plates carried above the plate 84 and secured to the frame 16. The pulleys 108 drive the belts 104 and those pulleys are rotated in opposite directions by appropriate driving connections extended to the noted driving chains beneath the plate 84. The adjacent flights of the two belts 104 carry the plants 11 from the starwheel 102 rearwardly of the machine to a drop tube 111 which is shown in enlarged detail in FIG. 5. Although not shown in the drawings, a guide channel can be mounted over each of the adjacent flights of the belts 104 with the forward ends of the guide channels being inclined downwardly and rearwardly of the machine so that the upper edge of each of the upper rings of the frames 11a of the plants 11 must pass beneath the guide channels. Such guide channels can be effectively used to positively insure that the upper ring of each frame 11a of each plant 11 will be accurately vertically aligned between the belts 104 such as shown in FIG. 5.

As the plants 11 reach the rearward end of the longitudinal conveyor 103, they fall into the drop tube assembly 111. As may be seen in FIG. 1, the upper end of the drop tube assembly 111 is provided with a pair of flared plates 112 for directing the top growth of each plant 11 within the confines of the drop tube 111. The drop tube assembly 111 further comprises a rear wall 113 and two horizontally spaced-apart sidewalls 114 secured to the frame 16. The drop tube assembly 111 directs each plant 11 downwardly into the plant setting means shown generally at 115 and mounted partially above and within the plow assembly 20. The lower end of the drop tube assembly 111, the plant setting means 115, and the plow assembly 20 are supported from the frame 16 by suitable brackets as shown. At the forward open side of the drop tube 111, a pair of sprocket wheels 116 and 117 are provided. Sprocket wheel 116 is rotatively carried on a bracket 118 near the upper end of the drop tube 111. Sprocket wheel 117 is rotatively mounted on a bracket 120 below sprocket wheel 116 and close to the bottom of the drop tube 111. A roller chain 121 is mounted about sprocket wheels 116 and 117 and that roller chain is provided with a plurality of shelf-like brackets 122 extending perpendicular to the length of the chain 121. A further sprocket wheel (not shown) is keyed to the same shaft that the sprocket wheel 116 is keyed and a roller chain 123 extends about that sprocket wheel and a sprocket wheel 124. Sprocket wheel 124 is rotatively mounted on the plate 125 and a cam 126 is keyed to the same shaft to which sprocket wheel 124 is keyed. An idler sprocket wheel 127 is provided for tensioning chain 123. A second sprocket wheel (not shown) is also keyed on the same shaft to which sprocket wheel 124 is keyed and a roller chain 128, shown in FIG. 1, is connected through appropriate gearing elements to the ground driven sprocket assembly previously noted at 41 and 42. Roller chain 128 is driven to rotate sprocket wheel 124 and cam 126 in a counterclockwise direction as viewed in FIG. 5. The rotation of sprocket wheel 124 causes sprocket wheels 116 and 117 to rotate in counterclockwise direction as viewed in FIG. 5. The plants 11, in dropping through the drop tube 111, fall onto one of the brackets 122 and by the descending flight of the chain 121 are carried to the bottom of the plant setting means 115 and dropped onto a plate 130. It is contemplated that if the free-fall of the plants 11 from the longitudinal conveyor 103 to and on the brackets 122 is too slow for the desired speed of operation of the machine, means such as powered rotating brushes can be mounted in cooperation with and through an open side of the drop tube 111 to sweep the plants 11 downwardly at a greater velocity. It is also contemplated that air under pressure is available at the machine, that an air jet can be used to gain a greater downward velocity.

The plow assembly 20 comprises two side plates spaced apart a distance sufficient to include the plant setting means with the forward ends of those slide plates being tapered and joined at a line at the forward end of the plow assembly 20. The plow assembly 20 further includes a bottom wall 131 secured between the two sidewalls thereof. The plate 130 is secured to a plate 132 upstanding therefrom and curved about a vertical axis as may be seen in FIGS. 5 and 8. The plate 132 is in turn secured to a bar 133, and the bar 133 is supported for horizontally reciprocating motion on two levers 134 and 135. One end of lever 135 is pivotally connected to the rearward end of bar 133, and one end of lever 134 is pivotally connected to bar 133 intermediate the ends thereof. The other end of each of the levers 134 and 135 is pivotally connected to the plate 125 at positions to produce a horizontal translation of plates 130 and 132 on bar 133 substantially parallel to bottom wall 131 when the levers 134 and 135 are pivoted, in a clockwise direction from the retracted position shown in FIG. 5, about the pivotal connections to the plate 125. Lever 134 is provided with an arm 136 rigidly secured thereto intermediate the ends thereof, and the extending end of arm 136 carries a cam roller 137 positioned to be engaged by cam 126 as cam 126 is rotated. A coiled spring 138 is secured between the lower end of lever 134 and a stop plate 140 secured to plate 125 to bias the bar 133 to the retracted position shown in FIG. 5.

The cam 126 is arranged so that the bar 133 is in the retracted position prior to the dropping of a plant 11 onto the plate 130 and against the upstanding curved plate 132. After a plant 11 is received upon the plate 130, the cam 126, in being rotated as described above, will engage the cam roller 137 to pivot the lever 134 to move the rod 133 rearwardly out of the plow assembly 20 at substantially the same speed that the plow assembly 20 is drawn through the ground. Thus it may be seen that relative to the ground, the bar 133 and the plates 130 and 132 secured thereto will hold a plant 11 at substantially zero speed relative to the ground.

At the rearward end of the sidewalls of the plow assembly 20 a pair of flexible flaps 143 are provided as may be seen in FIGS. 5 and 8. The flaps 143 are formed of a flexible material such as rubber or a fabric reinforced rubber material. The flaps 143 are each secured to one of the sidewalls of the plow assembly 20 at the rearward edge thereof by brackets 144 and fasteners 145 to align the flexible flaps 143 to extend toward each other and toward a vertical plane substantially midway between the sidewalls. The flaps 143 are further preferably angled rearwardly as shown in FIG. 8. The flaps 143 serve to center and align a plant 11 in an upright condition on the plate 130 and against the plate 132 to minimize any tendency of a misaligned plant 11 delivered to the plate 130 to tip or fall from the plate 130 as the bar 133 is moved rearwardly relative to the plow assembly 20. As the bar 133 moves to its rearwardmost position relative to the plow assembly 20, the plant 11 will be pushed between and rearwardly of the flaps 143 as the flaps 143 are caused to flex outwardly against the sides of the frame 11a of the plant 11. In a reduction of practice to the invention, the latter action appeared to steady the plant 11 as the opened ground rearwardly of the plow assembly 20 fell or slid against the frame 11a of the plant 11.

At the end of the rearward stroke of the bar 133, the cam 126 will release the lever 134 and the spring 138 will snap the bar 133 forwardly within the plow assembly 20 to the retracted position shown in FIG. 5.

In the present embodiment, the machine is further provided with a pair of ground closing wheels 141 which may be seen in FIGS. 1 and 2. The ground closing wheels 141 are rotatively carried on angled stub shafts supported from a bar 142 to carry the ground closing wheels 141 immediately rearwardly of the plow assembly 20 and to rotate in planes converging toward the ground. As the machine is drawn along the ground, the ground closing wheels 141 will close and pack the earth about the plants 11 that have been set into the ground in the furrow that has been opened by the plow assembly 20 as the machine has been pulled along the ground. Those skilled in this art will understand that other known types of ground closing or earth directing means may be used in substitution of or in addition to the ground closing wheels 141 to effectively compact, hill or otherwise produce a desired form of the earth about each set plant 11.

From the foregoing detailed description of one preferred embodiment of the invention, those skilled in this art will understand inherent capability of the machine for the high-speed planting of plants. In a reduction to practice of the machine described, it has been observed that the machine appeared capable of being pulled along the ground in a planting operation at speeds of up to five miles per hour and to plant tomato transplants at such speeds with a spacing between plants of approximately sixteen inches. Important to the invention is the handling and conveying of the plants in groups to permit high speed operation. Not only is it important that the plants be handled in groups as described, but it is also important that positive location, holding and control of the plants be provided in substantially every part of the machine in order to provide for positive, accurate high-speed planting of the plants.

Having described the invention, it is to be understood that changes can be made in the described embodiments by those skilled in the art within the spirit and scope of the claims.

We claim:

1. A planting method comprising the steps of:

providing a plurality of plants in a flexible web in an array of adjacent rows and substantially perpendicular ranks and in which said web has apertures vertically therethrough the sidewalls of which fix said plants in upstanding positions against sidewise movement but for permitted individual removal movement in an upward longitudinal axial direction free from said array, successively applying a force to the underside of each rank of plants in a longitudinal axial direction to successively remove each rank of plants from said array as a group, during said last step, contemporaneously conveying each removed group of plants in a line of successive groups of said plants, and successively planting each plant of said line of successive groups of said plants in the ground along a line.

2. A planting method comprising the steps of:

providing a plurality of plants in a flexible web in an array of adjacent rows and substantially perpendicular ranks and in which said web has apertures vertically therethrough the sidewalls of which fix said plants in upstanding positions against sidewise movement but for permitted individual removal movement in an upward longitudinal axial direction free from said array, bending said web in a curve about an axis parallel to said ranks of plants to spread the top growth of the plants apart in the direction of said rows, contemporaneously successively applying a force to the underside of each rank of plants in a longitudinal axial direction to successively remove each rank of plants from said web as a group, during said last step, contemporaneously conveying each removed group of plants in a line of successive groups of said plants, and successively planting each plant of said line of successive groups of said plants in the ground along a line.

3. A planting method comprising the steps of:

providing a plurality of plants with each plant in a frame and with said frames in a flexible web in an array of adjacent rows and substantially perpendicular ranks and in which said web has apertures vertically therethrough the sidewalls of which fix said frames with said plants therein in upstanding positions against sidewise movement but for permitted individual removal movement of each frame and plant growing therein in an upward longitudinal axial direction free from said web, successively applying a force to the underside of each frame of each rank of frames with a plant growing therein in an upward longitudinal axial direction to successively remove each frame with a plant growing therein in each rank of frames from said web as a group, during said last step, contemporaneously conveying said removed groups of frames with said plants therein in a line of succesive groups of said frames with said plants growing therein, and successively planting each frame with a plant growing therein of said line of successive groups of said frames with said plants therein in the ground along a line.

4. In a planting machine, plant setting means for setting plants in the ground as the machine moves forwardly over the ground, a flexible web having apertures vertically therethrough the sidewalls of which hold a frame in each of which a plant is growing, said web holding each frame in an upstanding position against any sidewise movement but for permitted individual movement in a longitudinal axial direction free from said web, said frames positioned in said web in an array of adjacent rows and substantially perpendicular ranks, means for moving said web through said machine in the direction of said rows of said array, delivery means for successively engaging the underside of each frame of each leading rank of frames as a group and for pushing each group of frames in a longitudinal axial direction upwardly out of said array as said web moves through said machine and delivering each frame of each group with said plant therein successively to said plant setting means as the machine moves forwardly over the ground.

5. In a planting machine, plant setting means for setting plants in the ground as the machine moves forwardly over the ground, a flexible web having apertures vertically therethrough the sidewalls of which carry a plurality of plants in an array of adjacent rows and substantially perpendicular ranks in which said plants are fixed in upstanding positions against sidewise movement but for permitted individual removal movement in an upward longitudinal axial direction free from said web, conveying means for moving said web through said machine in the direction of said rows of said array, delivery means for engaging the underside of each successive rank of said plants to move said plants longitudinally axially upwardly relative to said web for removal of said plants from said web, said delivery means further including means for carrying each successive rank of plants after said longitudinal axial upward movement of said plants relative to said web from said web as said web moves through said machine and delivering each plant of each rank of plants successively to said plant setting means as the machine moves forwardly over the ground.

6. In a planting machine as defined in claim 5, said conveying means including wheel means for bending said web in a curve about an axis parallel to said ranks to spread apart the top growth of said plants in the direction of said rows in said array as said web moves through said machine, and said delivery means being arranged to engage the underside of said plants to move said plants longitudinally axially to remove each rank of plants as a group from said web during bending of said web.

7. In a planting machine as defined in claim 6, said delivery means including a plurality of reciprocating rods, and means for moving said rods against the underside of each rank of plants during bending of said web to push each rank of plants longitudinally axially from said web, a pivotally mounted plate arranged in said machine to catch each rank of plants pushed from said web when said plate is in a generally horizontal position and to drop each rank of plants in an upright condition when said plate is pivoted from said generally horizontal position to a generally vertical position, and said delivery means further including a conveyor positioned to catch each rank of plants dropped from said plate and convey said plants in a row to said plant setting means.

8. In a planting machine as defined in claim 7, said plant setting means including means for setting each of said plants in the ground during a time interval as said machine moves forwardly over the ground, and means for substantially preventing horizontal movement of each of said plants in the ground during said time interval.

9. In a planting machine as defined in claim 8, a ground wheel rotated in response to said machine moving forwardly over the ground, and drive means connected to said ground wheel and said plant setting means for operating said plant setting means responsive to rotation of said ground wheel.

10. In a planting machine as defined in claim 9, drive means connected to said ground wheel and said conveying means and said delivery means to operate said conveying means and said delivery means responsive to rotation of said ground wheel.

11. In a planting machine having means for delivering individual plants successively to a plant setting means for setting said plants successively in the ground in a spaced-apart relationship to each other along a line, the improvement of said plant setting means comprising a plow member for opening a furrow in the ground as the machine is moved over the ground, said plow member comprising a pair of spaced-apart sidewalls extending longitudinally of said plow member, a plant conveying mechanism for successively receiving individual plants and for carrying said individual plants successively substantially vertically downward between said sidewalls of said plow member, a plant supporting bracket movably supported within said plow member between the sidewalls thereof substantially at the bottom thereof, said bracket comprising a substantially horizontally aligned bottom wall providing a platform for carrying a plant thereupon and a vertical wall extending upwardly from said bottom wall at a position forwardly of said platform, and means for moving said bracket along a substantially horizontal line in a repeating reciprocating motion between a retracted position and a rearward position rearward of said retracted position and immediately rearwardly of said plow member and in a timed relationship to said plant conveying mechanism to successively receive one of said plants on said platform on said bottom wall and on the rearward side of said vertical wall of said bracket in said retracted position and further in a timed relationship to the movement of said planting machine over the ground to move said bracket and a plant thereon to said rearward position at a speed substantially corresponding to the speed of said planting machine over the ground.

12. In a planting machine as defined in claim 11, and a pair of flexible flaps, each of said flexible flaps secured to the rearward vertical edge of one of the sidewalls of said plow member and extending toward a vertical plane substantially midway between said sidewalls of said plow member.

* * * * *